(12) United States Patent
Marceleno

(10) Patent No.: US 8,973,986 B1
(45) Date of Patent: Mar. 10, 2015

(54) BICYCLE SADDLE TO REDUCE PERINEAL PRESSURE

(71) Applicant: Jon A. Marceleno, University City, MO (US)

(72) Inventor: Jon A. Marceleno, University City, MO (US)

(*) Notice: Subject to any disclaimer, the term of this patent is extended or adjusted under 35 U.S.C. 154(b) by 213 days.

(21) Appl. No.: 13/733,611

(22) Filed: Jan. 3, 2013

Related U.S. Application Data

(60) Provisional application No. 61/631,344, filed on Jan. 3, 2012.

(51) Int. Cl.
*B62J 1/00* (2006.01)
*B62J 1/26* (2006.01)

(52) U.S. Cl.
CPC *B62J 1/007* (2013.01); *B62J 1/002* (2013.01); *B62J 1/26* (2013.01)
USPC .......................................... 297/202; 297/199

(58) Field of Classification Search
CPC ............ B62J 1/002; B62J 1/005; B62J 1/007; B62J 1/26
USPC .......................................... 297/199, 202, 201
See application file for complete search history.

(56) References Cited

U.S. PATENT DOCUMENTS

| | | | |
|---|---|---|---|
| 556,250 A | 3/1896 | Brown | |
| 576,960 A | 2/1897 | Hunt | |
| 579,442 A * | 3/1897 | Pool | 297/199 |
| 1,858,477 A * | 5/1932 | Blake | 297/202 |
| 3,997,214 A | 12/1976 | Jacobs | |
| 4,898,422 A * | 2/1990 | West, III | 297/202 |
| 5,165,752 A | 11/1992 | Terry | |
| 5,330,249 A * | 7/1994 | Weber et al. | 297/214 |
| 5,356,205 A * | 10/1994 | Calvert et al. | 297/452.41 |
| 5,387,024 A * | 2/1995 | Bigolin | 297/202 |
| 5,524,961 A * | 6/1996 | Howard | 297/199 |
| 5,636,896 A * | 6/1997 | Howard | 297/199 |
| 5,645,315 A * | 7/1997 | Walker et al. | 297/215.1 |
| 5,904,396 A | 5/1999 | Yates | |
| 6,106,059 A | 8/2000 | Minkow et al. | |
| 6,149,230 A | 11/2000 | Bontrager | |
| 6,176,546 B1 | 1/2001 | Andrews | |
| 6,231,122 B1 | 5/2001 | Goldstein | |
| 6,254,180 B1 * | 7/2001 | Nelson | 297/201 |
| 6,450,572 B1 | 9/2002 | Kuipers | |
| 6,669,283 B2 | 12/2003 | Yu | |
| 6,886,887 B2 | 5/2005 | Yu | |
| 7,025,417 B2 | 4/2006 | Cohen | |
| 7,441,836 B2 * | 10/2008 | Chen et al. | 297/202 |
| 7,478,871 B2 * | 1/2009 | Pandozy | 297/202 |
| 7,628,451 B2 * | 12/2009 | Chuang | 297/201 |
| 7,635,162 B2 | 12/2009 | Ljubich | |
| 7,661,756 B2 * | 2/2010 | Chen et al. | 297/202 |
| 7,661,757 B2 | 2/2010 | Chuang | |
| 7,699,392 B2 | 4/2010 | Chuang | |
| 2002/0003364 A1 | 1/2002 | Minkow et al. | |

(Continued)

*Primary Examiner* — David R Dunn
*Assistant Examiner* — Tania Abraham
(74) *Attorney, Agent, or Firm* — Grace J. Fishel

(57) ABSTRACT

A bicycle saddle adapted to reduce pressure on a rider's perineum zone including a shell having a support portion for the ischial tuberosities and a narrow nose portion extending forward of the support portion. A channel of sloped depth runs substantially the length of the nose portion and follows the dimensions of the human body. The channel is depressed at a shoulder of the support portion so that little or no pressure is applied by the saddle to the central point of the perineal body. An air filled elastic member may be provided in the channel.

5 Claims, 4 Drawing Sheets

(56) References Cited

U.S. PATENT DOCUMENTS

2003/0025364 A1   2/2003   Antonio
2006/0119146 A1   6/2006   Webler
2009/0079237 A1*  3/2009   Riondato .................. 297/201
2009/0261632 A1* 10/2009   Chuang .................... 297/199

* cited by examiner

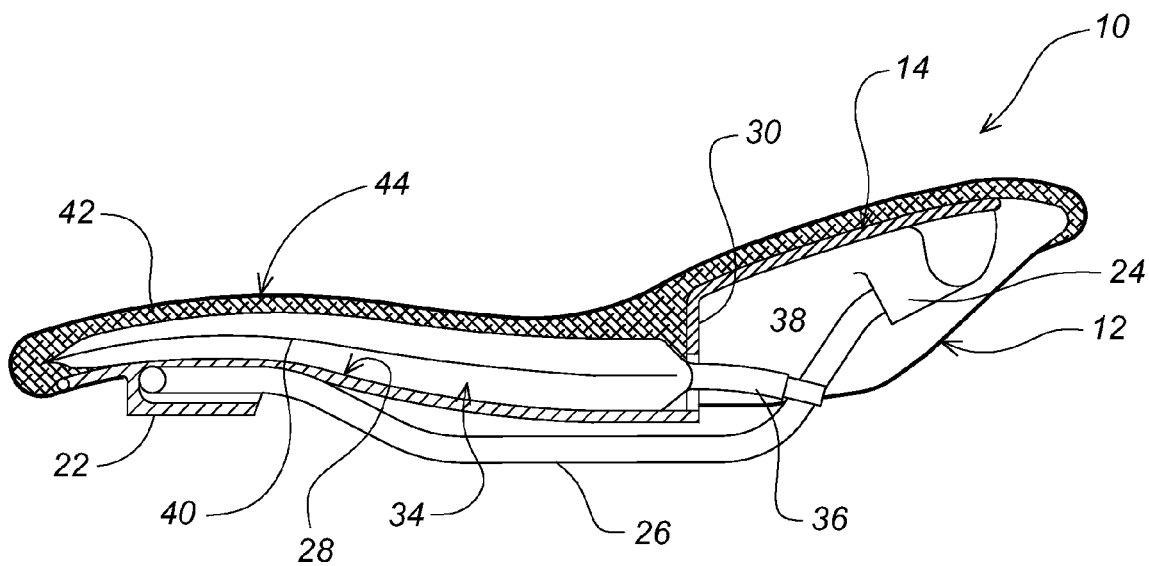
Fig. 5
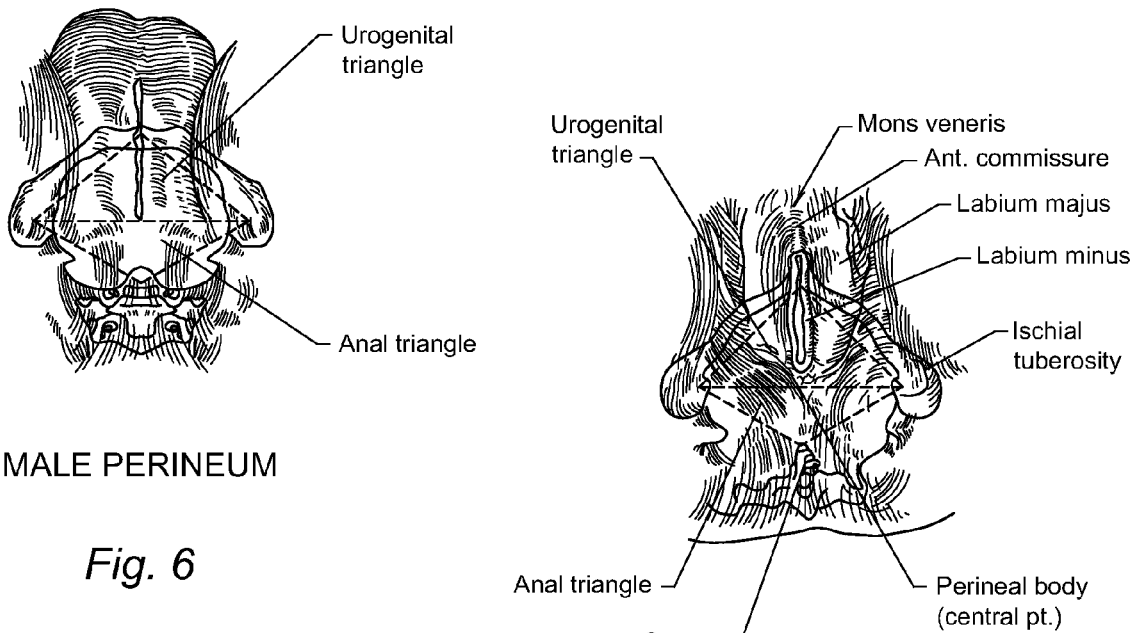
MALE PERINEUM
Fig. 6
FEMALE PERINEUM
Fig. 7

BICYCLE SADDLE TO REDUCE PERINEAL PRESSURE

This application claims priority from provisional application Ser. No. 61/631,344, filed Jan. 3, 2012, for Bicycle Seat.

BACKGROUND OF THE INVENTION

1. Field of the Invention

The present invention relates to a bicycle saddle with a bladder filled groove for applying variable degrees of pressure to a rider's perineum zone.

2. Brief Description of the Prior Art

The pelvic girdle has two ischial tuberosities commonly called "sit bones" covered with muscle and fat which are ideal for supporting the body. Sitting on a chair is not risky for sexual structures as no organs are attach to the ischial tuberosities, and no nerves and blood vessels are related to them but sitting on and straddling a bicycle saddle is. This is because some of a rider's weight is transferred to the pubic ischial-rami, to which sexual structures attach and are consequently compressed.

The perineum zone is an area between the anus and the base of the penis in the case of a male and the base of the clitoris in the case of a female. In the perineum zone there are pudendal arteries and pudendal nerves essential to sexual function. Pressure on pudendal nerves between a bicycle seat and the pelvic bones can cause temporary numbness or pain. While most cases are reversible and temporary, there have been reports of long-term sexual dysfunction. Pressure in the perineum zone also compresses the pudendal arteries which may cause temporary erectile disfunction, and repeated flattening of them may cause impotence. Perineal pain, numbness and erectile disfunction are significant drawbacks to an otherwise healthy and enjoyable sport for a serious bicycle rider.

There are bicycle saddles that are designed to relieve pressure on the perineum zone and to avoid the above-mentioned problems. One such design has a central channel formed in the middle of the saddle to avoid pressure on the perineum. Thanks to the channel, the rider sits on the surface of the saddle supported by the gluteal muscles, the ischial tuberosities and the pubic-ischial rami with the perineum zone out of contact with the saddle. The channel may make the saddle uncomfortable when the bicycle is ridden in any weather and some riders complain that no perineal support is uncomfortable and that sitting on the saddle feels like sitting on a groove.

BRIEF SUMMARY OF THE INVENTION

In view of the above, it is an object of the present invention to provide a bicycle saddle that reduces perineal pressure. It is another object to provide bicycle saddle that selectively provides cushioned contact with the perineum zone. It is also an object to provide a bicycle saddle wherein the cushioned contact may be user adjusted. Other objects and features of the invention will be in part apparent and in part pointed out hereinafter.

In accordance with the invention, a bicycle saddle adapted to reduce pressure on a rider's perineum zone comprises a shell with a support portion and a nose portion. The support portion has an upper surface upon which opposing ischial bones of a rider can be supported and the nose portion extends axially forward. A channel that follows the dimensions of the human body so that pressure is reduced on the perineum is provided in the nose portion extending from the support portion substantially the length of the nose portion. The channel is deepest at the support portion and is adapted to be positioned under the rider's perineum zone.

In one embodiment of the saddle, an air filled elastic member is provided in the channel. In use, the rider's perineum zone makes minimal contact with the elastic member at the deepest part of the channel near support portion and comes progressively in contact along the length of the elastic member.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which:

FIG. 5 is a cross-section taken along the plane of 5-5 in FIG. 1;

FIG. 6 is a medical illustration of the male perineum; and,

FIG. 7 is a medical illustration of the female perineum

DETAILED DESCRIPTION OF THE INVENTION

Figure 1:
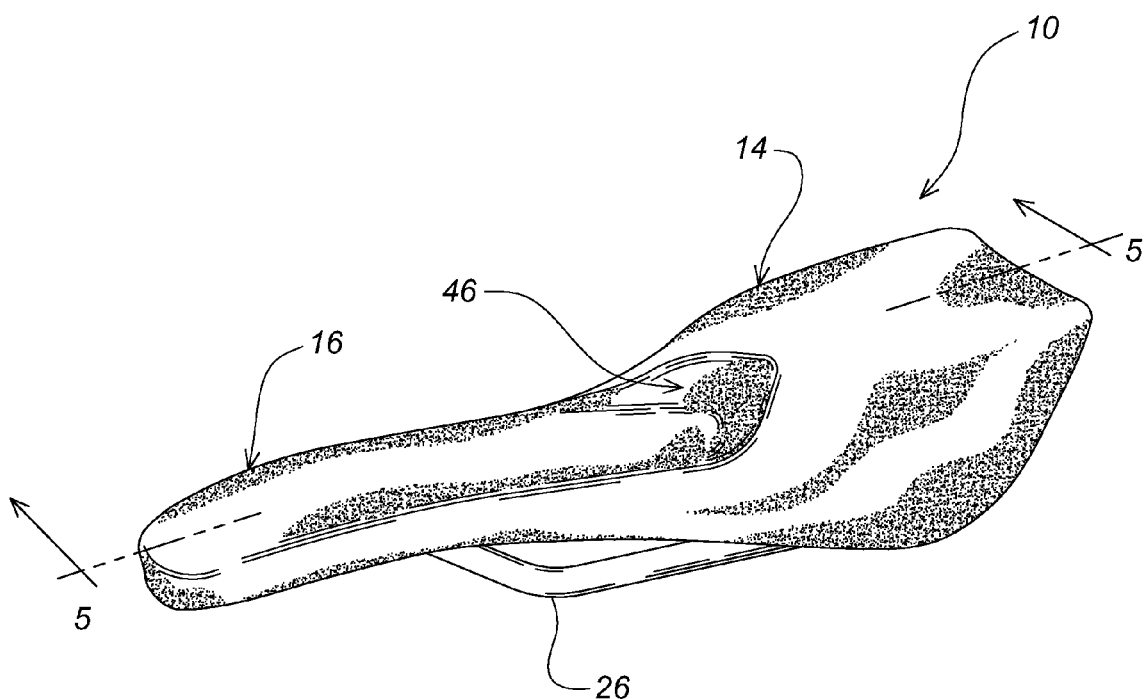
FIG. 1 is a perspective view of a bicycle saddle in accordance with the present invention.
Figure 2:
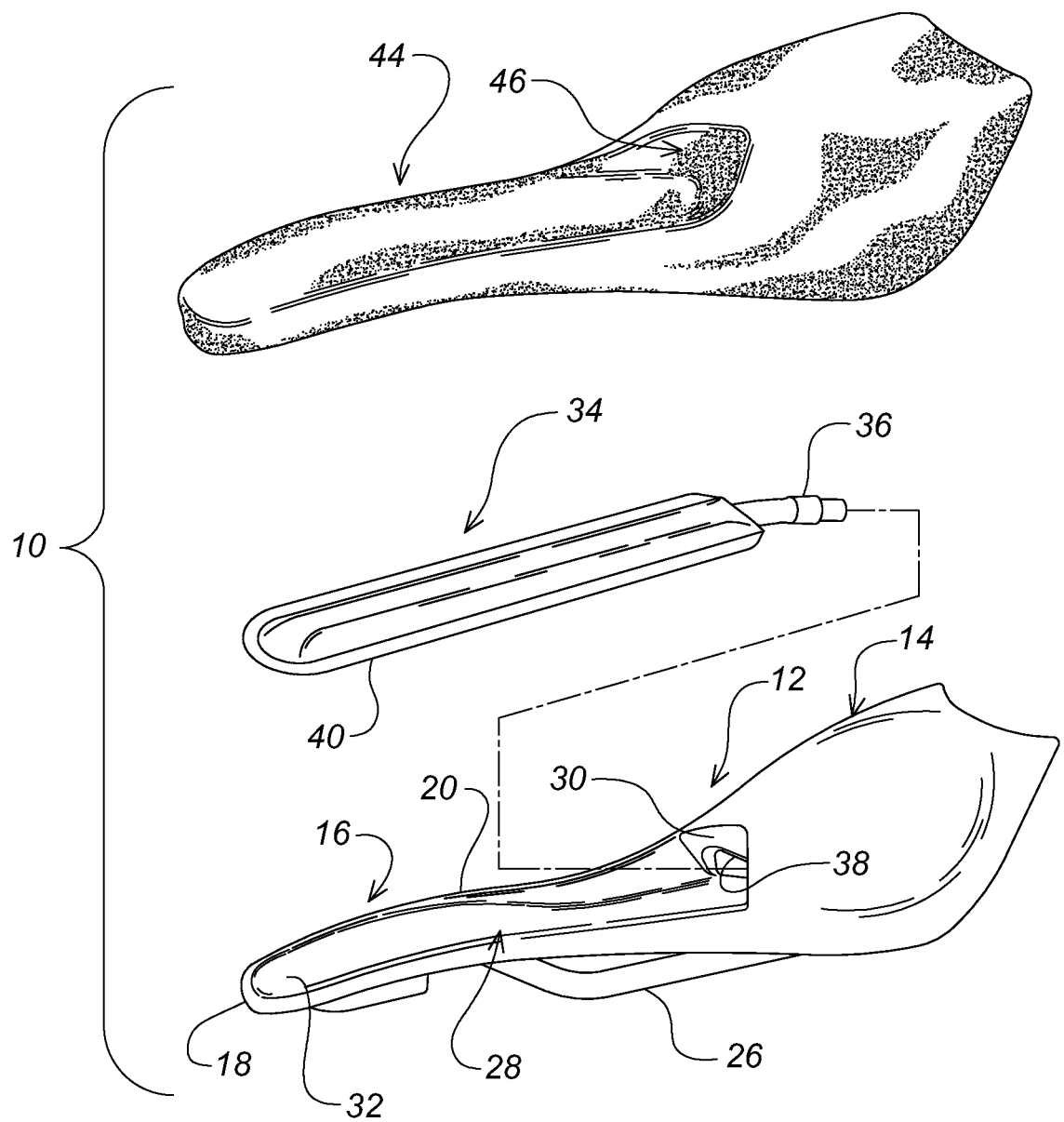
FIG. 2 is an exploded view of the bicycle saddle comprising a shell, an air filled elastic member and a cover.

Referring to the drawings more particularly by reference character, a bicycle saddle 10 in accordance with the present invention includes a shell 12. Shell 12 is constructed from plastic or another rigid material such as titanium or aluminum. Shell 12 is substantially wedge shaped and includes a flared rear support portion 14 that is shaped slightly concave upon which opposing ischial bones of a rider can be supported and a narrow nose portion 16 extending axially forward of support portion 14 and tapering slightly towards a forward end 18. Support portion 14 is kicked up or angled with respect to nose portion 16 and nose portion has a flattened arched curve in cross-section with a high point 20 and a downwardly sloped forward end 18 as shown in FIG. 2. Protuberances 22, 24 are provided on an under surface of shell 12 for connection of a support rail 26 by means of which saddle 10 is attached to a bicycle post (not shown) in a usual manner.

Shell 12 includes a channel 28 in an upper surface of nose portion 16 extending from support portion 14 substantially the length of nose portion 16. Support portion 14 is stepped down at a shoulder 30 to channel 28 which follows the dimensions of the human body so that pressure is reduced on the perineum. Channel 28 is deepest at shoulder 30 and is sloped upwardly to high point 20 and then downwardly towards forward end 18 of nose portion 16. In the form illustrated, channel 28 is generally rectangular with a rounded end wall 32.

Figure 3:
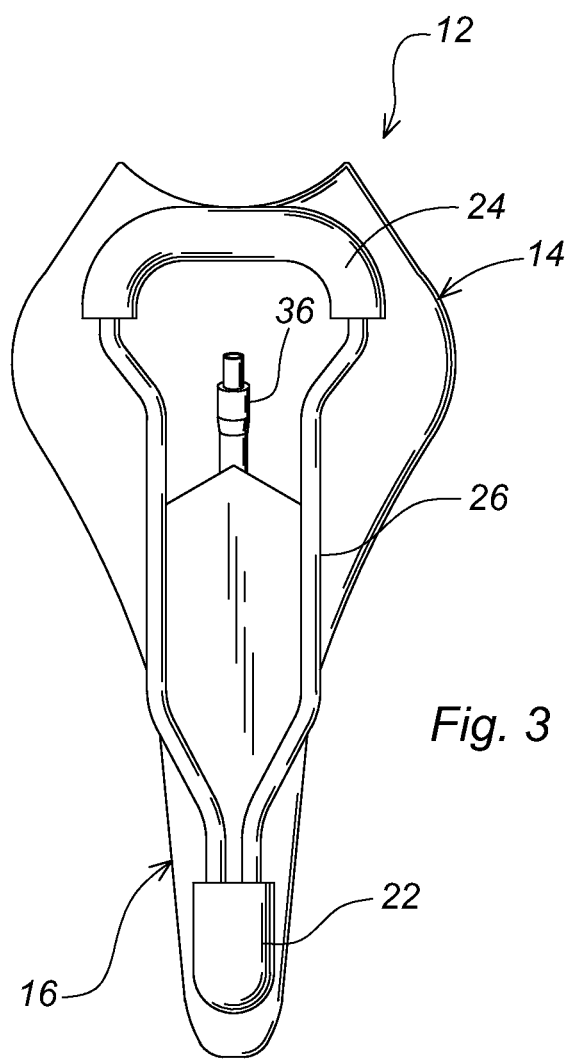
FIG. 3 is a bottom plan view of the bicycle saddle.
Figure 4:
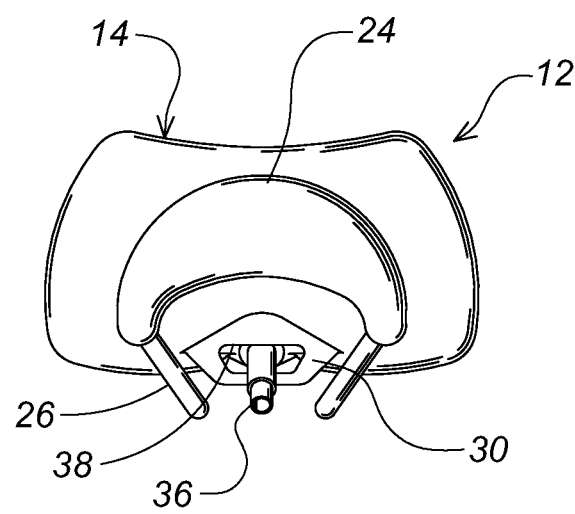
FIG. 4 is a rear elevation of the bicycle saddle.

An air filled elastic member 34 with an air valve 36 is fitted in channel 28. As best seen in FIGS. 3-4, air valve 36 is accessible from the under surface of shell 12 through an aperture 38 provided in shoulder 30. Elastic member 34 may be tubular with a flange 40 overlying the edges of channel 28 and running along the side edges and rounded bottom 32 thereof. A padding 42 formed of one or more resilient layers may be applied to shell 12 over support portion 14 and over flange 40 of elastic member 34. A cover 44 consisting of spandex, vinyl, artificial leather, leather or the like may be applied over padding 42 and elastic member 34 to complete saddle 10. As shown, a depression 46 is formed in saddle 10 adjacent shoulder 30.

In use, saddle 10 is mounded to a bicycle post with rails 26 generally horizontal as shown in FIG. 5. When a rider is seated on saddle 10 with his ischial tuberosities supported on support portion 14, saddle 10 is adapted to position his or her perineum zone within the urogenital triangle as shown in FIGS. 6 and 7 over channel 28 with a central point of the perineal body over depression 46. Air filled elastic member 34 then comes progressively in contact with the perineum zone along elastic member 34 to high point 20. Thus the pudendal nerves and arteries are spared compression where critical yet the perineum zone is given support along other portions and air and water flow through channel 28 is blocked. The extent that the rider requires cushion contact in the perineum zone depending on the rider's weight and other factors may be customized by increasing or decreasing the pressure in air filled elastic member 34.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A bicycle saddle, adapted to reduce pressure on a rider's perineum zone comprising a shell with a support portion and a nose portion, said support portion having an upper surface upon which opposing ischial bones of a rider can be supported and a shoulder between the support portion and the nose portion, said nose portion extending axially forward of the support portion; said nose portion being narrow and tapering slightly towards a forward end, said nose portion being a flattened arched curve in longitudinal cross-section with a high point midway the shoulder and a downwardly sloped forward end and a longitudinal channel in an upper surface of the nose portion extending from the support portion substantially the length of the nose portion, said channel stepped down at the shoulder of the support portion, said channel being deepest at the shoulder and sloped upwardly to the high point and downwardly towards the forward end of the nose, said channel adapted to be positioned under the rider's perineum zone, an air filled tubular elastic member fitted into the channel, whereby the rider's perineum zone makes minimal contact with the elastic member at the support portion and comes progressively in contact along the length of the elastic member.

2. The saddle of claim 1 wherein the support portion is kicked up with respect to the nose portion.

3. The saddle of claim 1 wherein the air filled elastic member has a flange along side edges and a rounded bottom edge, said air filled elastic member having an air valve which passes through an aperture in the shoulder of the support portion.

4. The saddle of claim 3 wherein padding is applied to the support portion and the flange of the air filled elastic member.

5. The saddle of claim 4 wherein a cover is applied over the shell and the padding with a depression formed adjacent the support portion.

* * * * *